US006406811B1

(12) United States Patent
Hall et al.

(10) Patent No.: US 6,406,811 B1
(45) Date of Patent: Jun. 18, 2002

(54) BATTERY FOR HEADSET ASSEMBLY

(75) Inventors: Ronald W. Hall, Stillwater, MN (US); Harry B. Taylor, Lafayette, CO (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/471,985

(22) Filed: Dec. 23, 1999

Related U.S. Application Data

(62) Division of application No. 08/837,440, filed on Apr. 17, 1997.

(51) Int. Cl.$^7$ .......... H01M 4/36
(52) U.S. Cl. .......... 429/96; 429/97
(58) Field of Search .......... 429/96, 97

(56) References Cited

U.S. PATENT DOCUMENTS

| | | | | |
|---|---|---|---|---|
| 303,553 A | | 8/1884 | Barnard | 381/379 |
| 1,182,896 A | | 5/1916 | Davison | 381/379 |
| 1,699,127 A | | 1/1929 | Wacker | 381/74 |
| 3,031,537 A | | 4/1962 | Rose | 381/330 |
| 3,101,155 A | | 8/1963 | Lehr et al. | 220/4.02 |
| 3,306,991 A | | 2/1967 | Wood | 381/72 |
| 3,906,160 A | | 9/1975 | Nakamura et al. | 381/9 |
| 4,409,492 A | | 10/1983 | Kamimura | 307/108 |
| 4,882,745 A | | 11/1989 | Silver | 455/568 |
| 4,904,549 A | * | 2/1990 | Goodwin et al. | 429/97 |
| 4,930,148 A | | 5/1990 | Lee | 455/568 |
| 5,113,428 A | | 5/1992 | Fitzgerald | 455/568 |
| 5,117,464 A | | 5/1992 | Jones et al. | 381/379 |
| 5,117,465 A | | 5/1992 | MacDonald | 381/379 |
| 5,185,807 A | | 2/1993 | Bergin et al. | |
| D342,947 S | | 1/1994 | Totsuka | |
| 5,321,848 A | | 6/1994 | Miyahira et al. | |
| 5,333,206 A | | 7/1994 | Koss | 381/370 |
| D364,417 S | | 11/1995 | Winston | |
| 5,508,123 A | * | 4/1996 | Fan | 429/96 |
| 5,530,763 A | | 6/1996 | Aebi et al. | 381/322 |
| 5,721,775 A | | 2/1998 | Leifer | 375/259 |
| D394,436 S | | 5/1998 | Hall et al. | |
| 5,784,471 A | | 7/1998 | Bebenroth | 381/322 |
| 5,825,896 A | | 10/1998 | Leedom | 381/322 |

FOREIGN PATENT DOCUMENTS

| | | |
|---|---|---|
| CH | 244196 | 3/1947 |
| EP | 0019838 | 5/1980 |

* cited by examiner

*Primary Examiner*—Stephen Kalafut
*Assistant Examiner*—Julian A. Mercado
(74) *Attorney, Agent, or Firm*—Stephen W. Buckingham

(57) ABSTRACT

An ergonomic headset assembly having increased comfort and convenience of use is provided. In accordance with one embodiment of the invention, a headset assembly is provided which includes a first headpiece pivotally coupled to a second flexible headpiece. The headset assembly further includes means for limiting the pivotal movement of the flexible headpiece with respect to the first headpiece. This allows the tension of the headset assembly to be suitable adjusted to the head size of the wearer. In accordance with another embodiment of the invention, a headset assembly which includes a headband and an electronics housing pivotally coupled to the headpiece is provided. The pivotal coupling of the electronics housing with respect to the headband allows the electronics housing to be swung away from a user's ear and provides additional comfort to the user. In accordance with yet another embodiment of the invention, a headset assembly having an electronics housing coupled to a clip member is provided. The clip member allows the electronics housing to be removably coupled between a headband and a hat of a user.

6 Claims, 10 Drawing Sheets

BATTERY FOR HEADSET ASSEMBLY

This application is a division of application Ser. No. 08/837,440, filed Apr. 17, 1997, pending, which is incorporated by reference herein.

FIELD OF THE INVENTION

The present invention relates generally to headset assemblies and, more particularly, to a headset assembly having improved ergonomics.

BACKGROUND OF THE INVENTION

Headset assemblies are frequently used in a wide variety of applications and across a broad range of industries. For example, in the fast food industry, one or more employees at drive-through fast food restaurants typically wear a headset assembly to receive orders from patrons in the drive-through lane. Similarly, in the banking industry, tellers at banks having drive-through lanes may wear headset assemblies to communicate with customers. In the retail industry, headsets are commonly used by stockroom and other employees to communicate with one another within a large area, such as a department store or a warehouse.

A typical headset assembly includes a headband and an electronics housing. The headband typically consists of one single-rate leaf spring having only one unstressed width, but which is flexed to fit different sized heads. The electronics housing is typically attached to one end of the headband and usually includes an earphone speaker, a microphone boom, and the electronic circuitry necessary to operate the earphone and microphone. While being commonplace in today's society, conventional headsets are extremely uncomfortable and inconvenient to use.

SUMMARY OF THE INVENTION

Generally the present invention relates to a headset assembly having increased comfort and convenience of use. In accordance with one embodiment of the invention, a headset assembly is provided which includes a first headpiece pivotally coupled to a second flexible headpiece. The headset assembly further includes means for limiting the pivotal movement of the flexible headpiece with respect to the first headpiece. This allows the tension of the headset assembly to be suitable adjusted to the head size of the wearer.

In accordance with another embodiment of the invention, a headset assembly which includes a headband and an electronics housing pivotally coupled to the headpiece is provided. The pivotal coupling of the electronics housing with respect to the headband allows the electronics housing to be swung away from a user's ear and provides additional comfort to the user.

In accordance with yet another embodiment of the invention, there is provided a headset assembly having an electronics housing removably coupled to a headband. The electronics housing may, for example, be removably coupled between a headband and a cap of a user. The headset assembly may include a clip member for removably coupling the headband to the electronics housing.

The above summary of the present invention is not intended to describe each illustrated embodiment. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
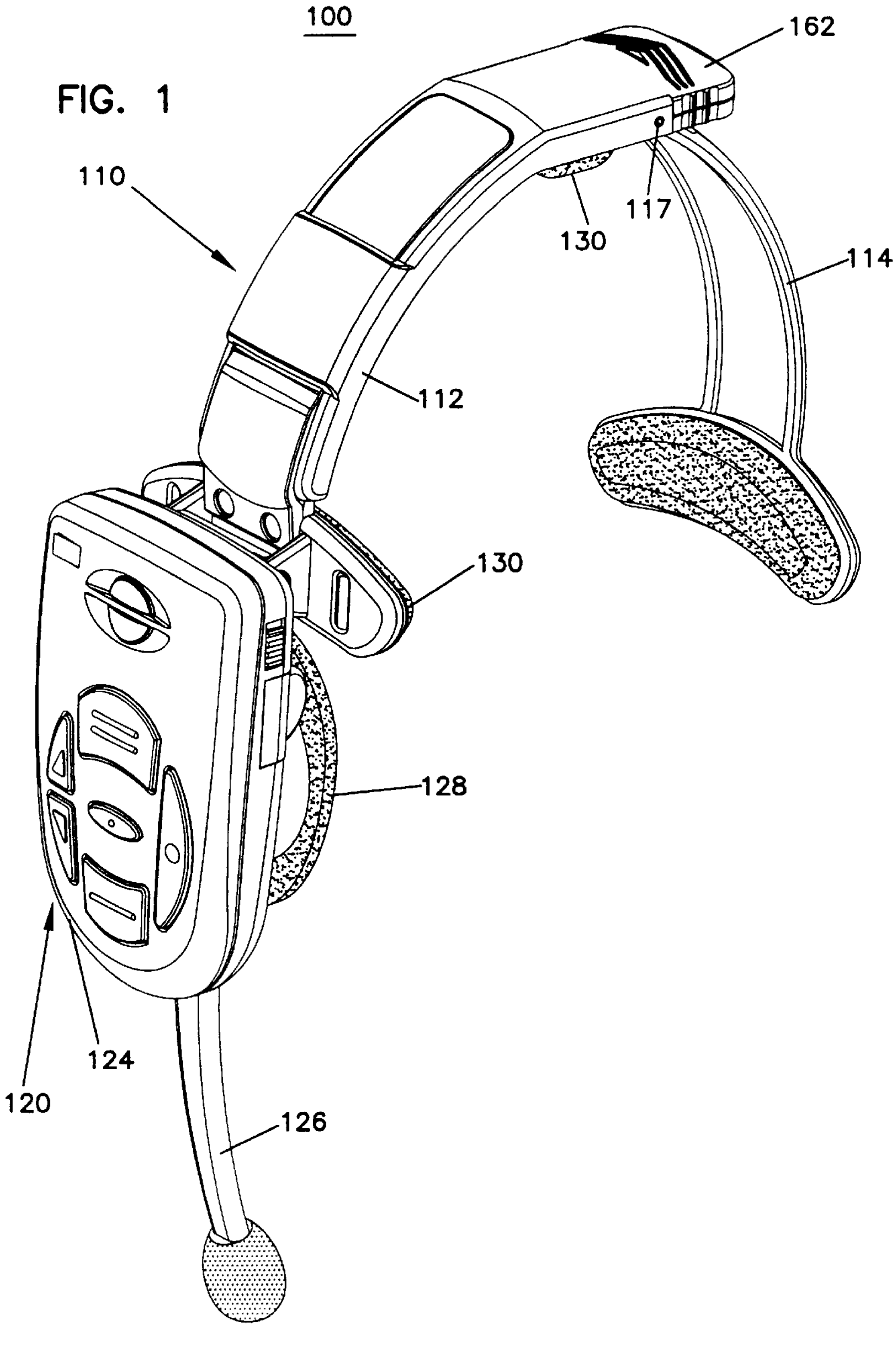
FIG. 1 is a perspective view of an exemplary headset assembly in accordance with one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The present invention generally relates to headset assemblies having one or more ergonomic features which increase the comfort and convenience of the headset assembly for a user. An appreciation of various aspects and features of the invention will be gained through a discussion of an exemplary embodiment. While the exemplary embodiment illustrates a headset assembly which incorporates a number of these features, the present invention is not so limited. Headset assemblies including any one or combination of the features are intended to be covered by the present invention.

Figure 2A:
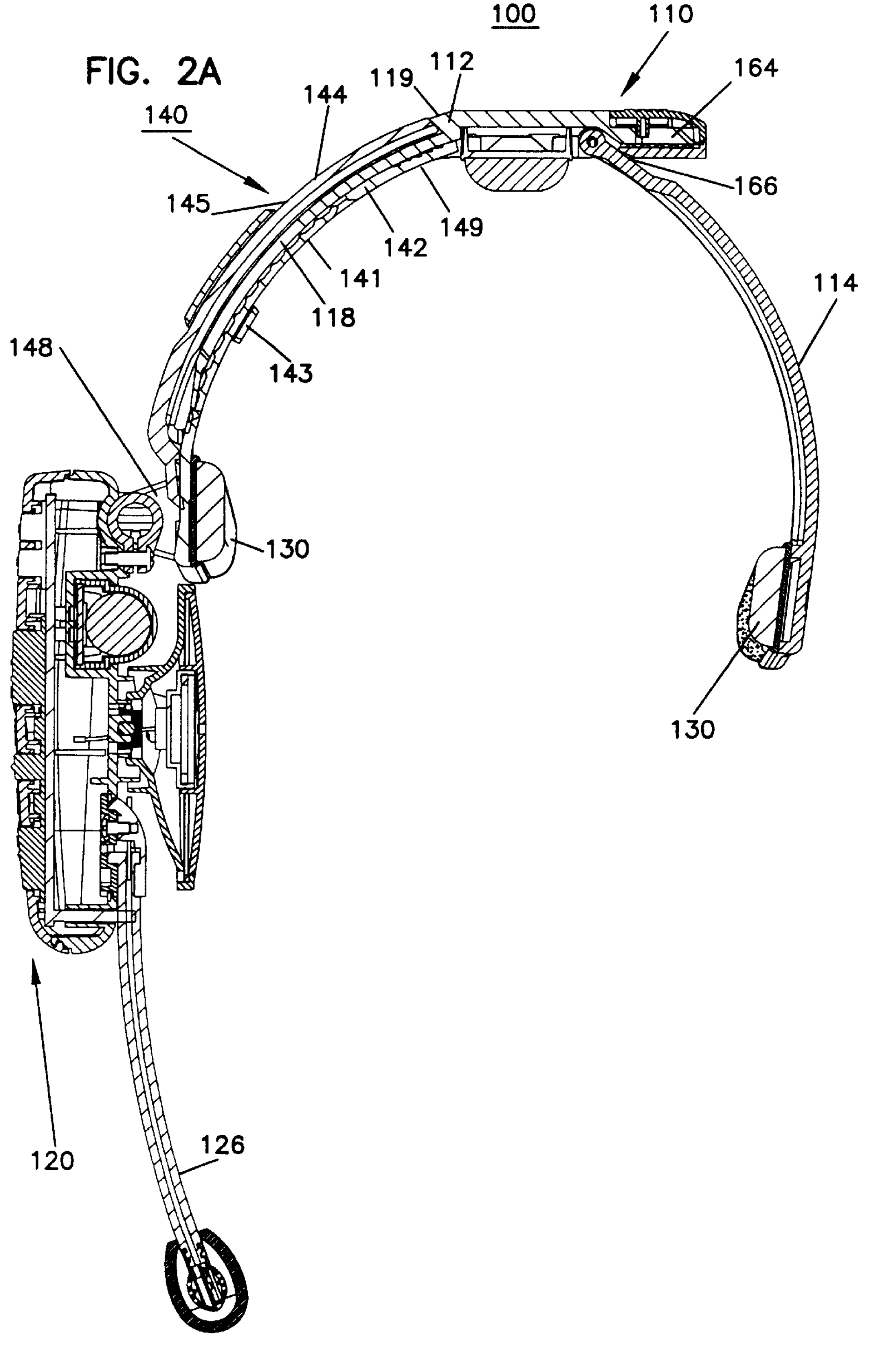
FIGS. 2A and 2B are front cross sectional views of the headset assembly of FIG. 1.
Figure 2B:
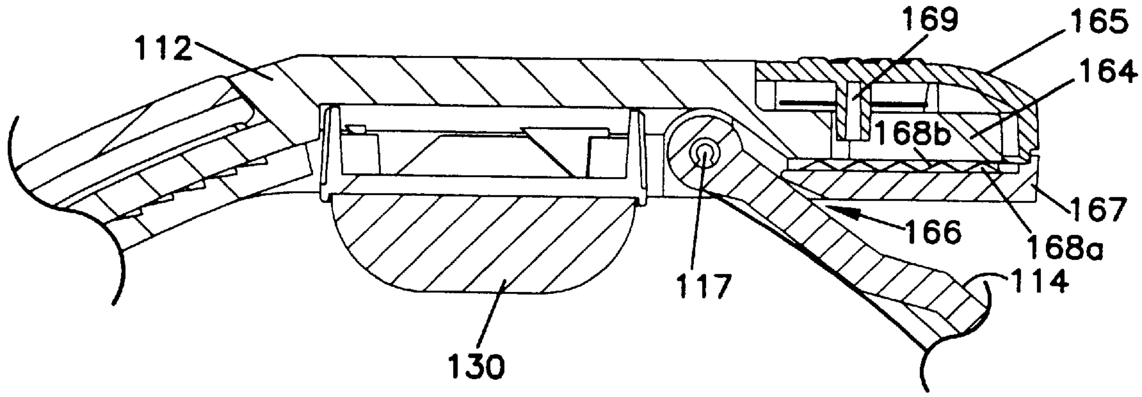

FIGS. 1 and 2A–2B are perspective and cross-sectional views of an exemplary headset assembly in accordance with one embodiment of the invention. The headset assembly 100 includes a headband 110 and an electronics housing 120. The electronics housing 120 generally encloses headset electronics, such as a circuit board, battery, etc. Mounted on the housing may, for example, be an earphone speaker 128, a microphone boom 126, and a touchpad 124 for operating the headset electronics. As should be appreciated, the earphone speaker 128 and microphone boom 126 are typically pivotally mounted to the housing 120 to facilitate comfortable positioning. Inwardly facing pads 130 formed, for example, from a polyethylene foam, may be mounted on the headset assembly 100. As will be discussed more fully below, a battery 900 is provided on the housing 120 as well.

As noted above, the exemplary headset assembly 100 illustrates a number of features which enhance the convenience and comfort for a user. The exemplary headband 110 advantageously allows a user to adjust the unstressed width of the headband. The headband 110 generally includes two headpieces 112 and 114, pivotally connected to one another, and a mechanism for limiting the pivotal movement of the headpieces so that the unstressed width of the headband 110 may be adjusted. At least one of the headpieces is relatively flexible so as to provide tension against the head of a user and thereby hold the headset in place.

In the illustrated embodiment, the two headpieces 112 and 114 include a relatively flexible headpiece 114 and a relatively rigid support headpiece 112. The support headpiece

112 generally provides a supporting structure against which the flexible headpiece 114 may bend so as to provide the desired head tension to keep the headset in place. The headpieces 112 and 114 may be made of a number of different materials. For example, the flexible headpiece 114 may be formed from a flexible plastic while the support headpiece 112 may be formed from a relatively more rigid plastic material. One suitable plastic is Nylon, for example.

The flexible headpiece 114 is pivotally coupled to the support headpiece 112 near the end of the support headpiece 112 using a pin 117. However the invention is not so limited. The pivotally connection may be formed in other manners. For example, the two headpieces 112 and 114 may be integrally formed with a relatively thin portion forming an integral hinge between the two headpieces.

In the exemplary embodiment, the mechanism for limiting the pivotal movement of the flexible headpiece 114 with respect to the support headpiece 112 includes a tab 162 slidably mounted on a portion 164 of the support headpiece 112, as best shown in FIG. 2B. In general, as the tab 162 is moved outwardly and inwardly, the unstressed width of the headband increases and decreases, respectively. In this manner, the unstressed width of the headband 110 may be appropriately adjusted to comfortably fit a user's head.

As best shown in FIGS. 2A and 2B, the tab 162 includes a surface 166 which engages the flexible headpiece 114 to both limit the pivotal movement of the flexible headpiece 114 as well as provide a structure against which the flexible headpiece 114 may flex or bend to provide head tension. The flexible headpiece 114 can be pivotally moved until it contacts the surface 166 at which point further movement of the flexible headpiece 114 results in the creation of a tensile force from the headpiece 114.

As best illustrated in FIG. 2B, the exemplary tab 162 includes an upper portion 165 and a lower portion 167, mounted to the extended portion 164 of the support headpiece 112 using a pin 169. The tab 162 includes a set of groves 168*a* which mate with a set of groves 168b on a surface of the headpiece portion 164 for setting the position of the tab 162 (and the width of the headband 100). A leaf spring 169 may be provided to bias the grove sets 168*a* and 168*b* against one another. The leaf spring bias generally allows the tab to be readily repositioned yet prevents the tab from slipping on the headpiece portion 164 when pressure from the flexible headpiece is applied.

It should be appreciated that the tab 162 is provided by way of example only. A wide variety of other structures and mechanisms may be used to limit the pivotal movement of the flexible headpiece 114. For example, a mechanism having a surface which is moved in a different plane than that of tab surface 166 may be used. Moreover, the present invention is not limited to three or any other fixed number of unstressed widths.

Figure 3:
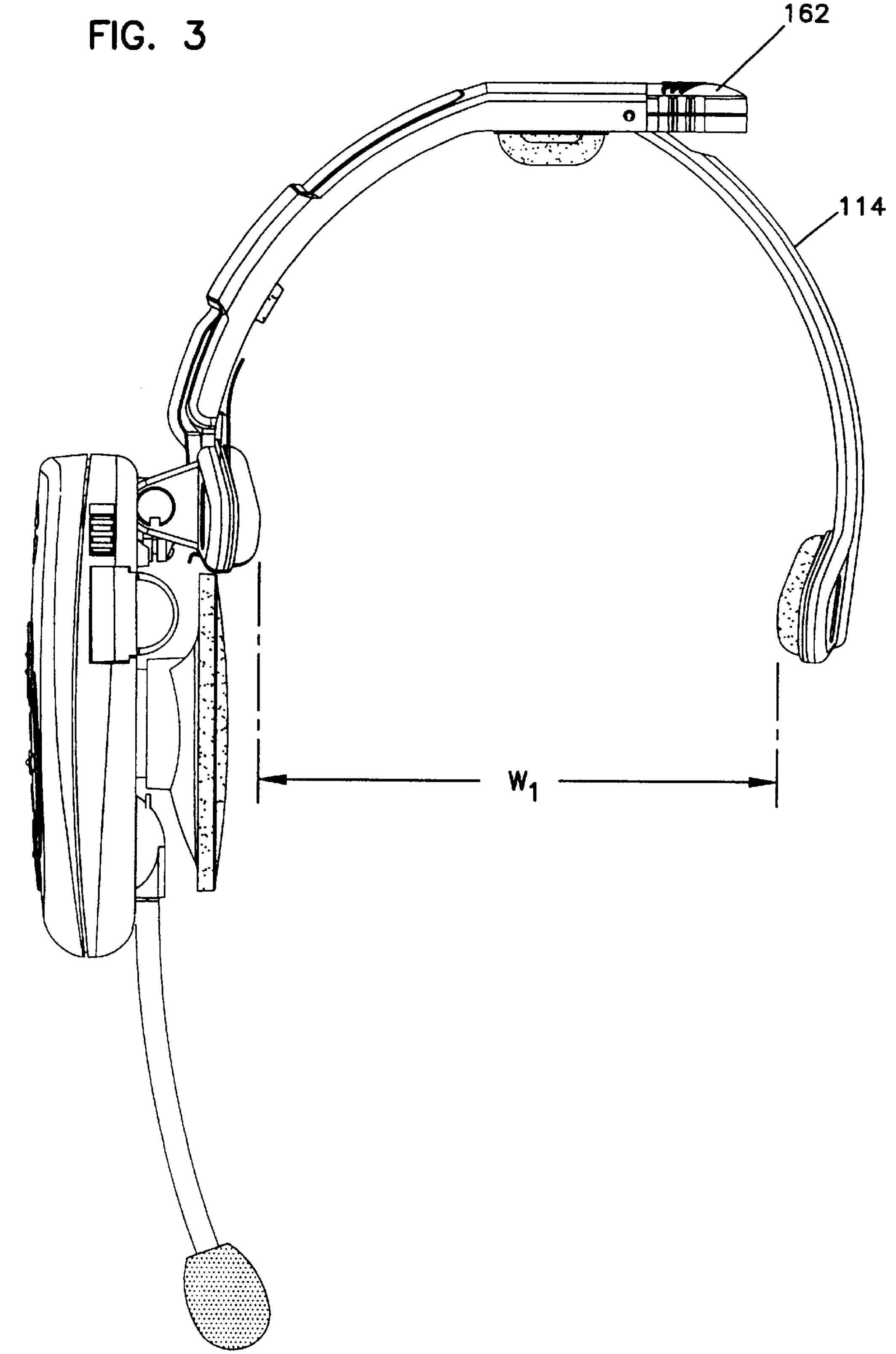
FIGS. 3–5 are front plan views of the exemplary headset assembly of FIG. 1 shown at different width settings.
Figure 4:
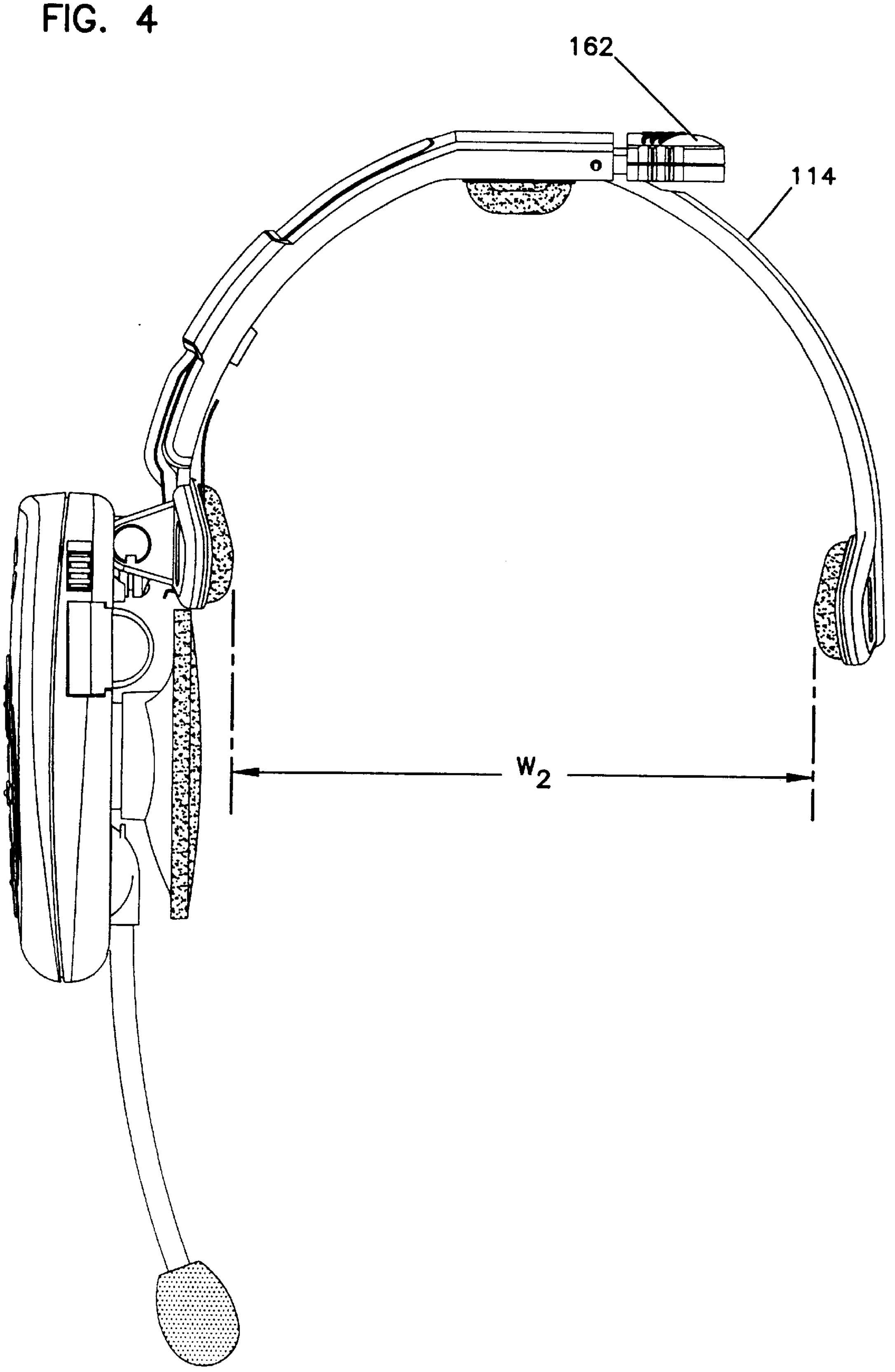
Figure 5:
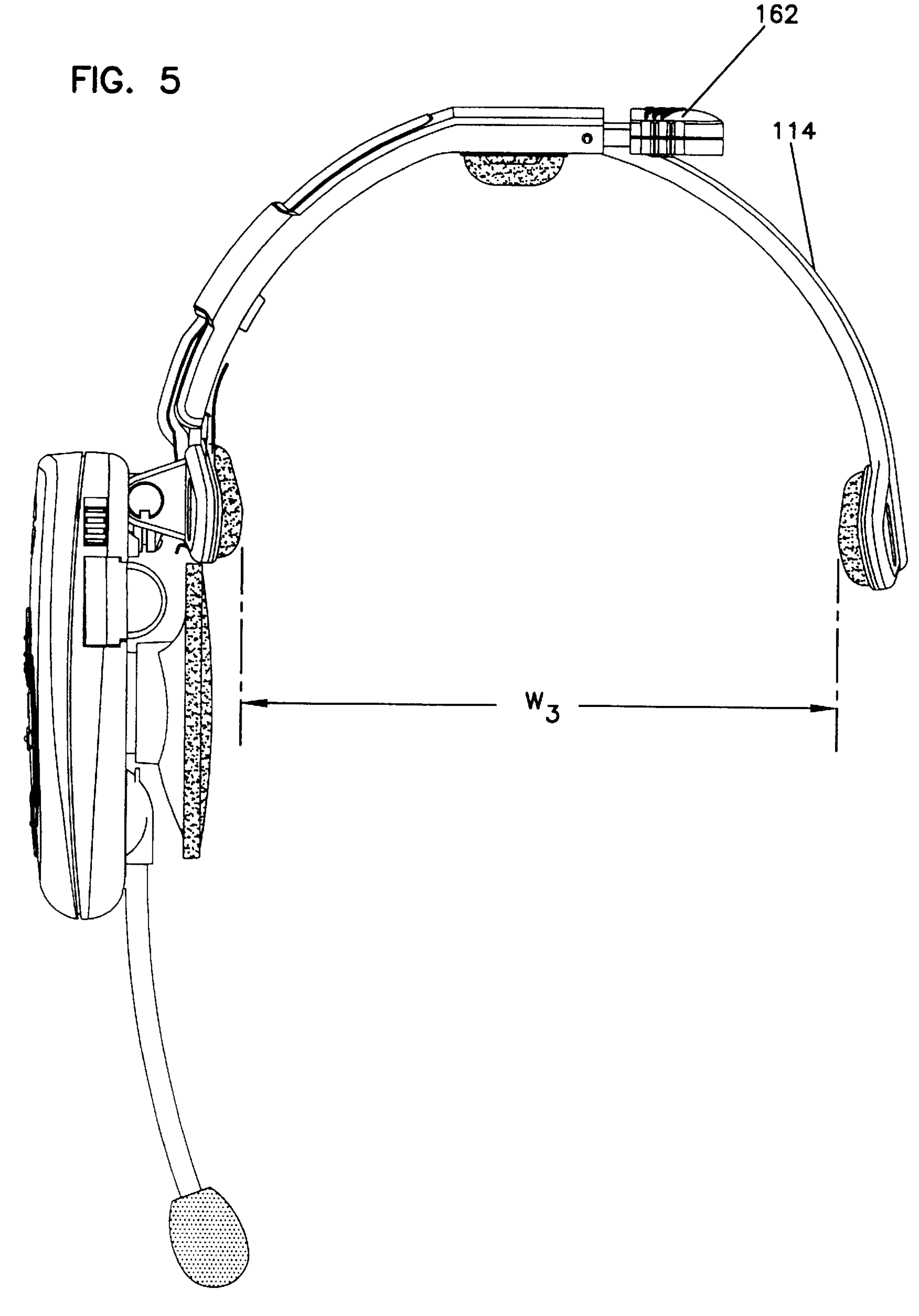

As illustrated in FIGS. 3–5, in the exemplary embodiment, the tab 162 is configured to allow pivotal movement of the flexible headpiece 114 to three different widths. More particularly, FIG. 3 illustrates the tab 162 at an inner most position, which allows the flexible headpiece to pivotally move outward to an unstressed width $W_1$. This provides the narrowest headband unstressed width and would be suitable for users having smaller head sizes. FIG. 4 shows the tab 162 at an intermediate position, which allows the flexible headpiece 114 to pivotally move to an unstressed width $W_2$. This provides an intermediate headband unstressed width and would be suitable for slightly larger head sizes. Finally, FIG. 5 depicts tab 162 at an outermost position, which allows the flexible headpiece to be pivotally moved to an unstressed width $W_3$. This provides the widest headband unstressed width $W_3$ for accommodating larger head sizes. The three unstressed widths $W_1$, $W_2$, and $W_3$ for the flexible headpiece 114 may be suitable selected to cover the broadest range of head sizes.

In operation, a user slides the tab 162 to a position which provides a desired unstressed headband width. Typically the unstressed width is slightly narrower than the user's head. The user then spreads the headband beyond its unstressed width by flexing the flexible headpiece 114 and slips the headband over his/her head. The tension provided by the stressed headband holds the headset in place.

The unstressed width of the above-described headband can advantageously be adjusted for various head sizes. Conventional headbands, as noted above, have only one unstressed width. With these conventional headbands, smaller heads are subject to less tension than larger heads. This often results in excessive tension on larger heads causing discomfort and too little tension on smaller heads making the headset prone to movement. The above headband alleviates these problems and allows users with different sized heads to receive more comparable head tension.

Figure 6:
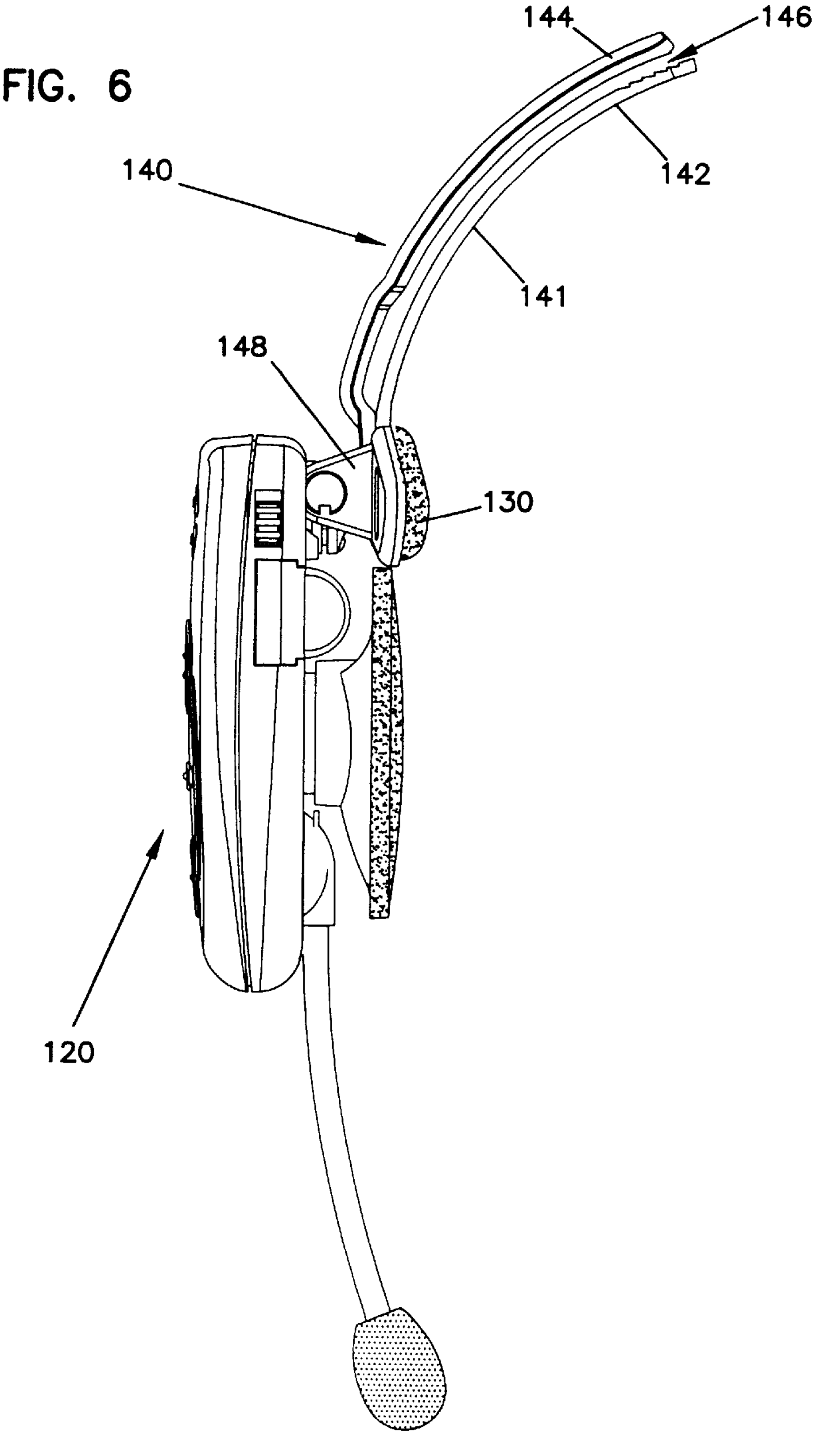
FIG. 6 is a front plan view of an exemplary clip member coupled to an electronic housing in accordance with one embodiment of the present invention.

As best illustrated in FIGS. 2A and 6–7, the illustrated headset assembly 100 further provides an electronics housing which may be readily removed from the headband 110 and, for example, attached to a hat of a user. The hat may, for example, be a baseball cap, a visor, and so forth. In the illustrated embodiment, an exemplary clip member 140, is provided to facilitate the interchangeability of the electronics housing 120 between a hat and a headband. While, the invention is not so limited, the clip member 140 may, for example, be made of a substantially rigid plastic material, such as Nylon.

The exemplary clip member 140 includes an upper portion 141 for attaching the clip member to the headband and hat, and a lower portion 148 to which the electronics housing 120 may be coupled. The clip member upper portion 141 includes two arms 142 and 144 which form a slot 146 therebetween. To attach the clip member 140 with the headband 110, a portion 118 of the support headpiece 112 is slidably received by the slot 146 of the clip member 140. The two arms 142 and 144 may be biased against one another with sufficient force to allow the clip member 140 to be slidably moved with respect to the support headpiece 112 while retaining the clip member 140 at a desired position with respect to the support headpiece 112 under normal conditions. The clip member arms may be formed separately or from one integral molding.

As best shown in FIG. 2A, the received portion 118 of the support headpiece 112 may be recessed with respect to an outer surface 119 of the support headpiece 112. The recess may be sufficiently deep to allow the outer surfaces 143 and 149 of the clip member arms 142 and 144 to be relatively flush with the outer surface 119 of the support headpiece 112. To secure the clip member 140 to the headband 110, the support headpiece 112 may include a tab which engages an opening in the clip member 140. The tab may be depressed for removing the clip member 140 from the headband 110. In an alternate embodiment, a depressable button may be provided on the clip member to secure the clip member 140 to the headband 110. The button may be depressed as the clip member 140 is slid downwardly against the headband to allow the clip member to be removed from the headband 110.

The clip member upper portion 141 may also be used to attach the electronics housing to a hat. For example, the clip member 140 may attach to a hat by slidably receiving a hat between the clip member arms 142 and 144. In an alternate embodiment, best illustrated in FIGS. 7A–7D, an adapter 700 is provided to attach the clip member 140 to a hat. The exemplary adapter 700 generally includes two legs 702 and 704, which are typically biased toward one another. The leg 704 includes an upper flange 706 having a slot 710 (as best shown in FIG. 7B) and a lower flange 708. To attach the adapter 700 to the clip member 140, the slot 710 receives clip member arm 142. The adapter 700 is slid down the arm 142 until the lower flange 708 clips beneath the pad 130. A hat is attached to the adapter by sliding it between the adapter arms 702 and 704. The cap adapter 700 may, for example, be formed from a stainless steel.

The above described clip member advantageously allows the electronics housing to be interchangeably connected to a headband and a hat. The exemplary clip member is illustrative only. The present invention is not so limited. For example, a clip member having only one leg which is received by a slot formed by the headband may be used to facilitate interchanging of an electronics housing. In this embodiment, a hat adapter could be employed to attach the clip member to a hat.

Figure 8:
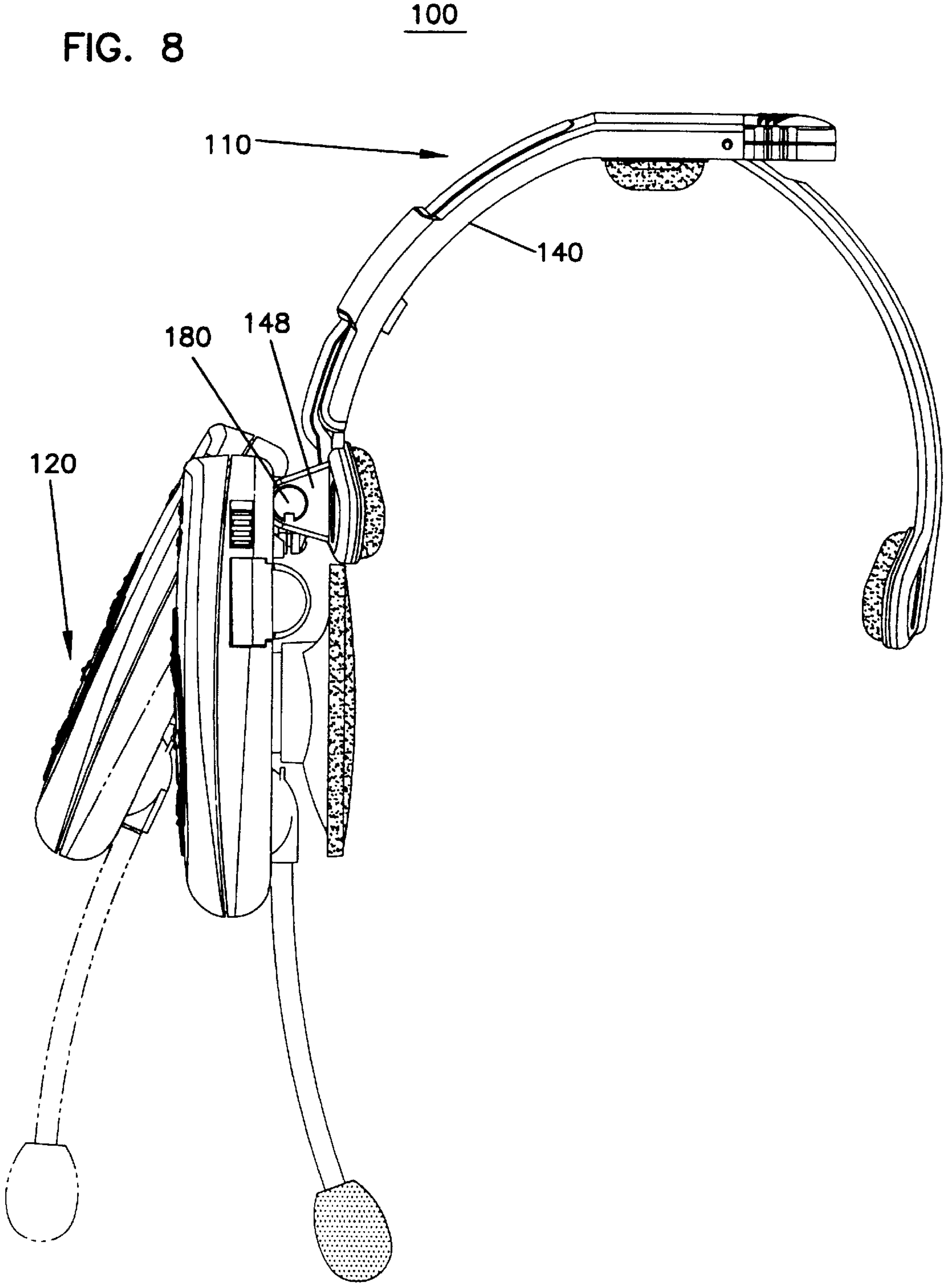
FIG. 8 is a front plan view of the exemplary headset assembly of FIG. 1.

As illustrated in FIG. 8, the exemplary headset assembly 100 further includes an electronics housing 120 which may be pivoted away from a user's ear. Generally the electronic housing 120 is pivotally coupled to the headband 110 using a hinge 110. The hinge 180 may, for example, include a variable friction pivot pin having a friction suitably selected to sufficiently hold electronic package 120 away from the user's ear while still allowing the electronics package 120 to be readily pivoted. This allows for the electronic package 120 to be positioned against the user's ear during periods of use and swung away from the user's ear during periods of nonuse or as desired to increase the comfort of the user.

In the exemplary embodiment, the electronics housing 120 is pivotally coupled with the headband 110 via the clip member 140. In particular, the electronics housing 120 is pivotally coupled with the clip member 140, for example, at the clip member extending portion 148. The clip member 140 is in turn attached to the headband 110, as discussed above. This allows the electronics housing 120 to be swung away from the user's ear when it is attached to a hat as well as a headband.

Figure 9:
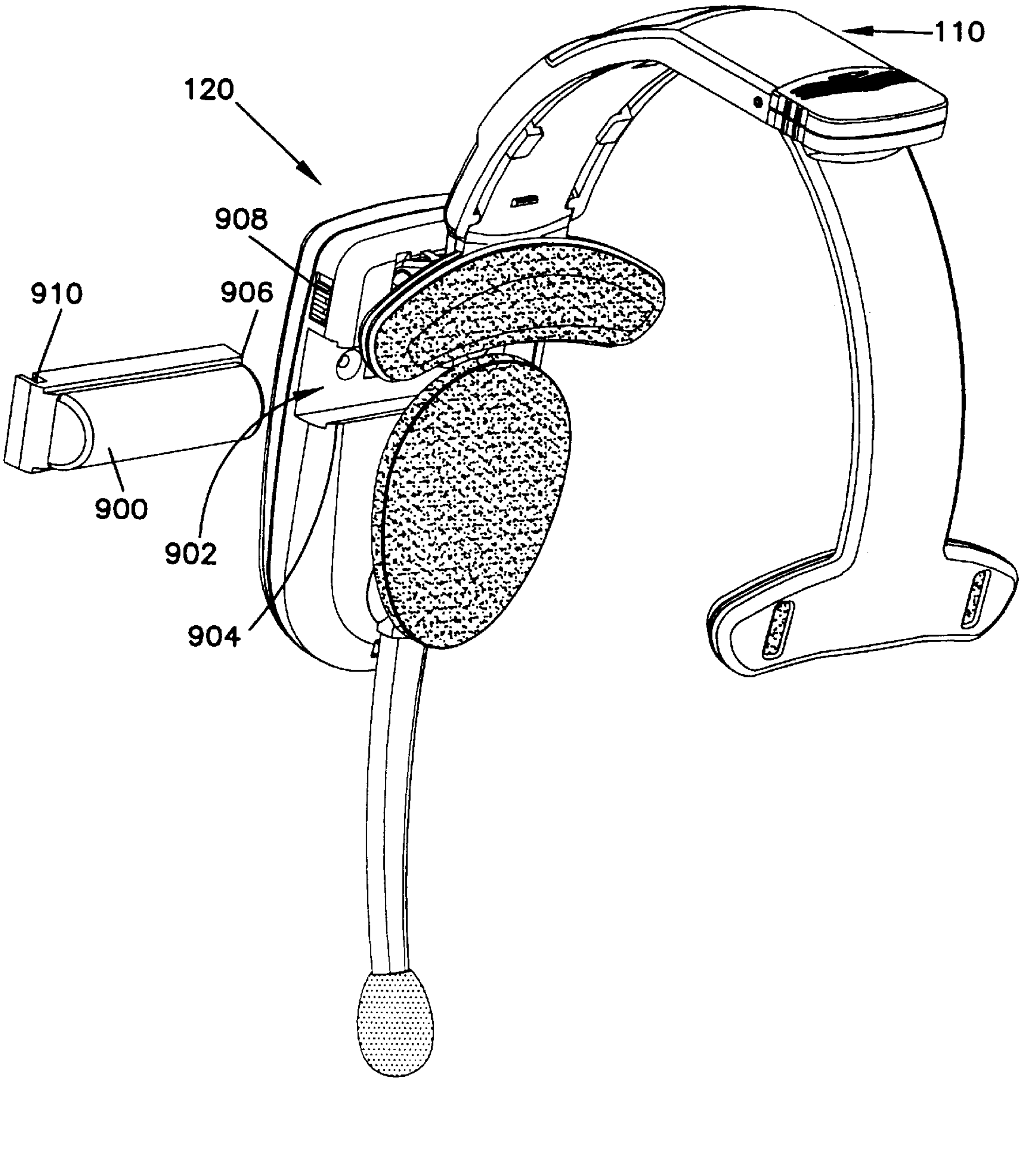
FIG. 9 is an exploded perspective view of the headset assembly of FIG. 1.

As best illustrated in FIGS. 2 and 9, the exemplary electronics housing 120 further includes a battery 900. A portion of the battery 900 may lie outside of the electronics housing when attached, as best shown in FIG. 2. For example, a portion of the battery 900 may occupy the space between the speaker 128 and the electronics housing 120. By attaching the battery 900 to the electronics housing 120, the need for wiring between one end of the headset 100 and the electronics housing 120 is eliminated. In addition, the housing 120 may be detached from the headband 110 and used for communication. By disposing the battery 900 between the housing 120 and the speaker 128, otherwise unoccupied space is used and the width of the housing 120 may be reduced while still providing sufficient power for the electronics in the housing 120.

The battery 900 may be attached to the electronics housing 120 in a number of different manners. In the exemplary embodiment, the battery 900 is slidably received by a slot 902 in the electronics housing 120, as best illustrated in FIG. 9. For securing the battery 900 in the slot 902, the received portion of the battery 900 and the slot 902 may have shapes or structural features which mate together to retain the battery 900. For example, the slot 902 may include flanges 904, on each side of the slot 902, which mate with corresponding recesses 906 on the battery 900. In the exemplary embodiment, a portion of a lower region of the battery 900 extends beyond an upper region of the battery 900 to form the battery recesses 906. A latch 908 may further be provided to secure the battery 900 in the axial direction of the slot 902. The latch 908 may, for example, be a spring loaded latch which is disposed upward while the battery 900 is inserted and which moves downward to engage a notch 910 in the battery 900 when the battery is fully inserted. To remove the battery 900, the latch 908 may be biased upwardly.

As noted above, the present invention is applicable to a wide variety of headset assemblies incorporating enhanced ergonomic features. While the illustrated embodiment incorporates a number of ergonomic features, the present invention is not so limited. Headset assemblies including any one or a combination of the features are covered by the present invention. Accordingly, the present invention should not be considered limited to the particular examples described above, but rather should be understood to cover all aspects of the invention as fairly set out in the attached claims various modifications as well as numerous equivalent structures to which the present invention may be applicable will be readily apparent to those of skill in the art to which the present invention is directed upon review of the present specification. The claims are intended to cover such modifications and structures.

We claim:

1. A battery for an electronics housing of a headset assembly, the battery having two ends and two sides running between the two ends, the battery comprising:

an upper portion having a width between the two sides of the battery;

a lower portion mating with the upper portion, the lower portion having a width, between the two sides of the battery, greater than the width of the upper portion thereby forming a pair of longitudinal slots along each of the two sides of the battery; and a notch for securing the battery to the electronics housing, the notch being defined by the lower portion of the battery, in one of the two sides, the notch being disposed proximate one of the ends of the battery.

2. The battery of claim 1, wherein a portion of the battery lies outside of the electronics housing when attached to the electronics housing.

3. The battery of claim 2, wherein the portion of the battery lying outside of the electronics housing is located in a space between the electronics housing and a depending speaker.

4. A battery for an electronics housing of a headset assembly, the battery having two ends and two sides running between the two ends, the battery comprising:

an upper portion having a width between the two sides of the battery;

a lower portion mating with the upper portion, the lower portion having a width, between the two sides of the battery, greater than the width of the upper portion thereby forming a pair of longitudinal shelves at the juncture point between the lower portion and the upper portion, the shelves located along the entire length of each of the two sides of the battery; and a recessed notch for securing the battery to the electronics housing, the notch being defined by the lower portion of the battery, in one of the two sides, the notch being disposed proximate one of the ends of the battery.

5. The battery of claim 4, wherein a portion of the battery lies outside of the electronics housing when attached to the electronics housing.

6. The battery of claim 4, wherein the portion of the battery lying outside of the electronics housing is located in a space between the electronics housing and a depending speaker.

* * * * *

UNITED STATES PATENT AND TRADEMARK OFFICE

CERTIFICATE OF CORRECTION

PATENT NO. : 6,406,811 B1
DATED : June 18, 2002
INVENTOR(S) : Hall et al.

Figure 7A:
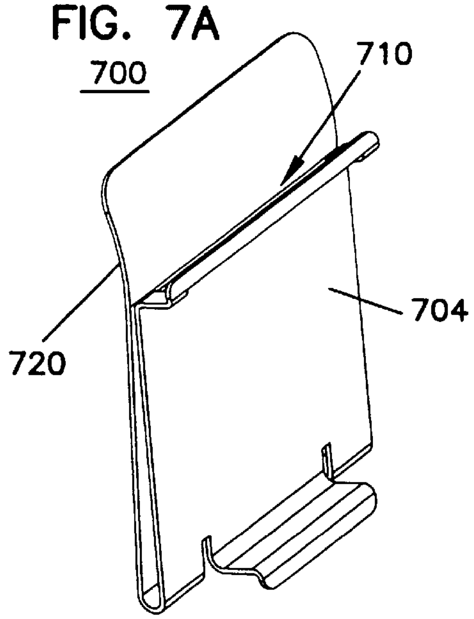
FIGS. 7A–7B are views of an exemplary adapter in accordance with one embodiment of the invention.
Figure 7B:
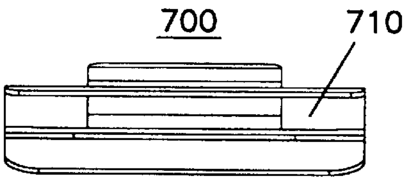
Figure 7C:
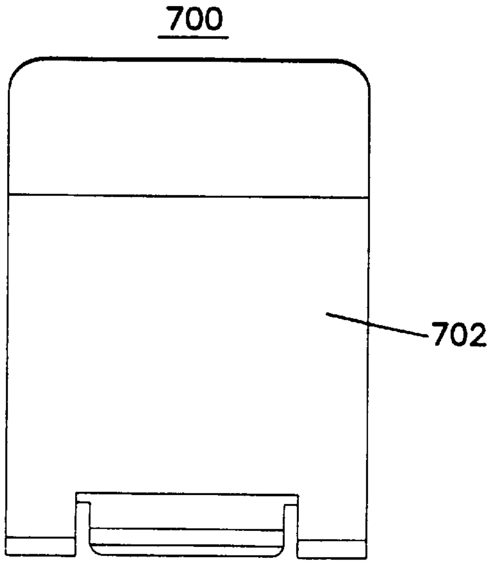
Figure 7D:
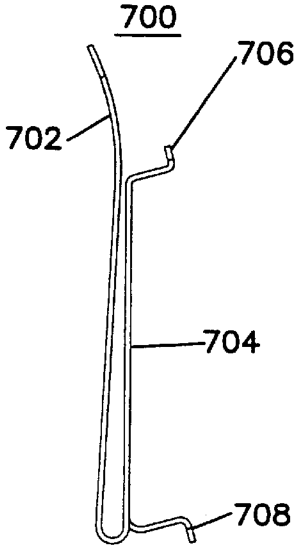

It is certified that error appears in the above-identified patent and that said Letters Patent is hereby corrected as shown below:

Column 2,
Line 13, "FIGS. 7A-7B" should read -- FIGS. 7A-7D --

Column 6,
Lines 13-14, "attached claims various" should read -- attached claims. Various --

Signed and Sealed this

Third Day of December, 2002

JAMES E. ROGAN
*Director of the United States Patent and Trademark Office*